May 14, 1968  E. A. POWERS  3,383,150
KALEIDOSCOPIC VIEWING DEVICE
Filed Aug. 11, 1965  2 Sheets-Sheet 2

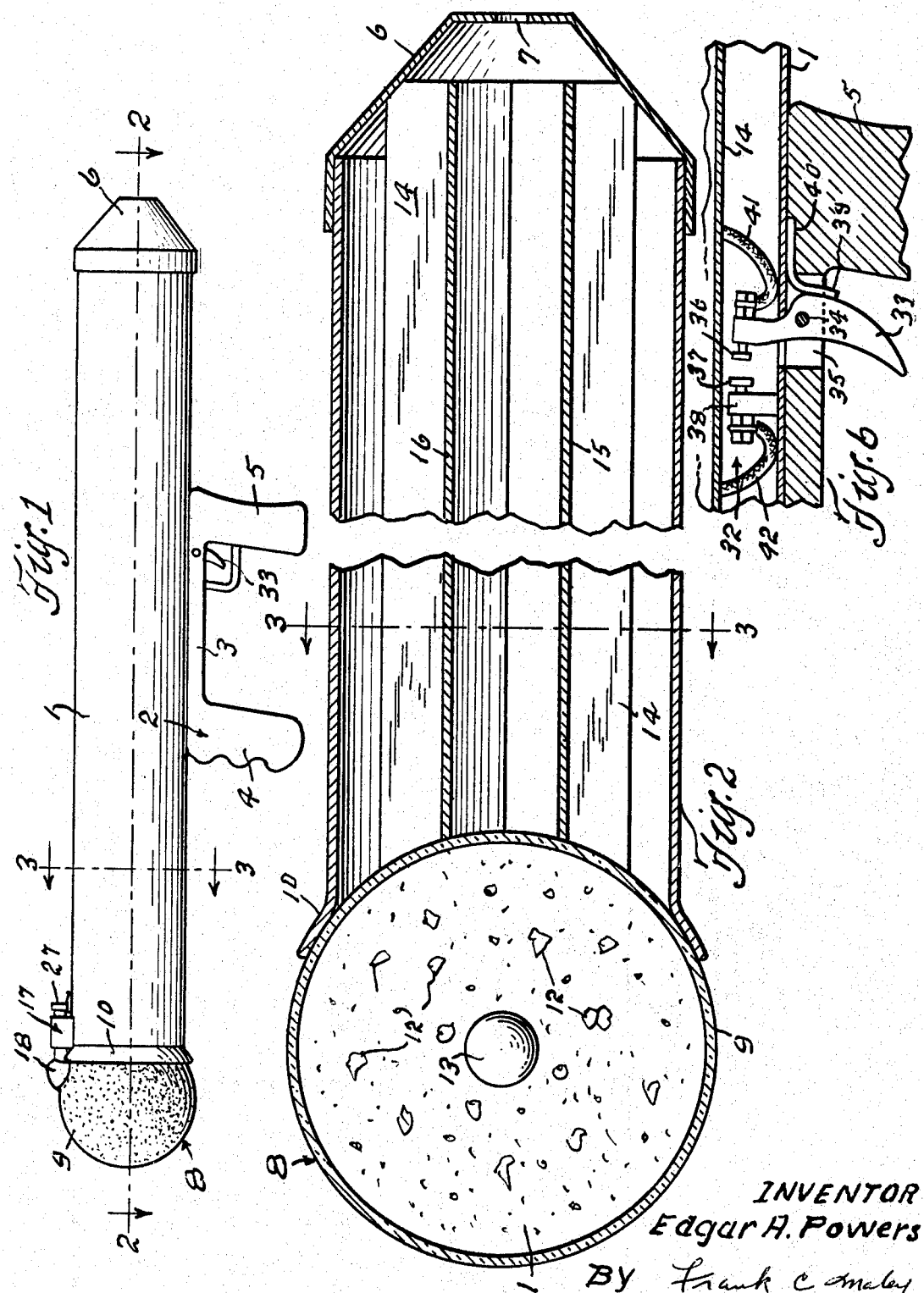

INVENTOR
Edgar A. Powers
BY Frank C. Maley
Agent

United States Patent Office 3,383,150
Patented May 14, 1968

3,383,150
KALEIDOSCOPIC VIEWING DEVICE
Edgar A. Powers, 104 Church St.,
Lake Ronkonkoma, N.Y. 11779
Filed Aug. 11, 1965, Ser. No. 478,869
7 Claims. (Cl. 350—5)

This invention relates to a viewing device of the kaleidoscopic character which is so constructed and arranged that the movement of the pattern producing objects is such that slow and graceful changes of patterns having a new perception of depth and animation are effected.

One of the principal objects of the invention is to provide a viewing device of the aforesaid character in which the movement of the pattern producing objects disposed in an object enclosure, is unrestricted so that they may variously move up or down, to either side, and toward or away from a viewer thereby providing a three-dimensional effect.

Another object of the invention is to provide a viewing device of the aforesaid character having a source of direct illumination incorporated therein, which is adapted to project light into the object enclosure against the pattern producing objects therein, thereby eliminating the necessity for directing the device toward an extraneous source of light and enabling the use of the device in a darkened atmosphere.

Still another object of the invention is to provide a viewing device of the aforesaid character in which all abrasion of the pattern producing objects resulting in the formation of a powdery residuent, which impairs vision, is eliminated.

Still another object of the invention is to provide a viewing device of the aforesaid character that is so constructed and arranged that the pattern producing objects are enabled to absorb light from all directions.

For the accomplishment of the aforesaid objects I provide a kaleidoscopic viewing device which comprises an elongated tubular body member having an eye piece, with an axially disposed sight opening therein, secured to one end thereof, and an object enclosure, in which the pattern forming objects are housed, secured to the other end thereof. A pair of opposed upwardly diverging conventional kaleidoscope reflectors are mounted in the body member and extend from the eyepiece to the object enclosure.

The object enclosure consists of a hermetically sealed hollow globe of clear transparent material which is substantially filled with a clear liquid such as water or transparent oil. The pattern producing objects, which are disposed within the globe, comprise a variety of objects and glittering particles of matter, which vary as to size, shape, color and density, from glittering powders of microscopic size to conventional sized objects of varying compositions and contrasting in specific gravity which results in some gradually sinking, some rising or floating and others remaining suspended in the liquid. A solid ball, or marble, is also housed within the globe. The ball or marble being of greater density than the liquid will always rest on the inner surface of the globe and will roll around thereon when the globe is rotated or moved up and down and thereby agitate the liquid and the pattern forming objects immersed therein.

The source of direct illumination which is incorporated in the device comprises a concave reflector, of the flashlight type, having a small light bulb mounted therein. The reflector, which is applied to the outer surface of the globe adjacent the junction of the body member therewith, is mounted in the forward end of a battery casing which is secured to the outer surface of the body member The portions of the object enclosure globe which are disposed within the end of the body member and under the reflector are clear and transparent, and the exposed portion thereof is frosted to render it translucent. The positive terminal of a battery, which is mounted in the battery casing, is spring pressed into engagement with the positive terminal of the light bulb by a coiled spring which is interposed between the rear end of the battery and a closure cap which is removably secured to the rear end of the battery casing. The energization of the light bulb is controlled by a switch which is interposed in the battery and light bulb circuit and is mounted within the body member. The switch is normally yieldingly spring biased to open position and is adapted to be closed and held closed by a finger actuated trigger which is associated with a handle secured to the outer surface of the body member intermediate the ends thereof. When the light bulb is energized the reflector projects the light into the globe directly onto the near side of the pattern producing objects therein. When this direct light is used alone at night with a dark background, the combination thereof with the slow movement of the objects through the liquid and the three dimensional effect, results in unusual blazon spectacles some of which resemble night explosions of fireworks in the sky.

Having stated the principal objects of the invention other and more specific objects thereof will be apparent from the following specification and the accompanying drawings forming a part thereof in which:

FIG. 1 is a side elevation of a kaleidoscopic viewing device constructed according to my invention;

FIG. 2 is an enlarged horizontal section, partially broken away, through the device as shown in FIG. 1, the plane of the section being indicated by the lines 2—2 on FIGS. 1 and 3;

FIG. 6 is a vertical longitudinal fragmentary detail section, on the same scale as FIGS. 2 and 3, illustrating the manually operable switch by which the energization of the light source is controlled.

Figure 4:
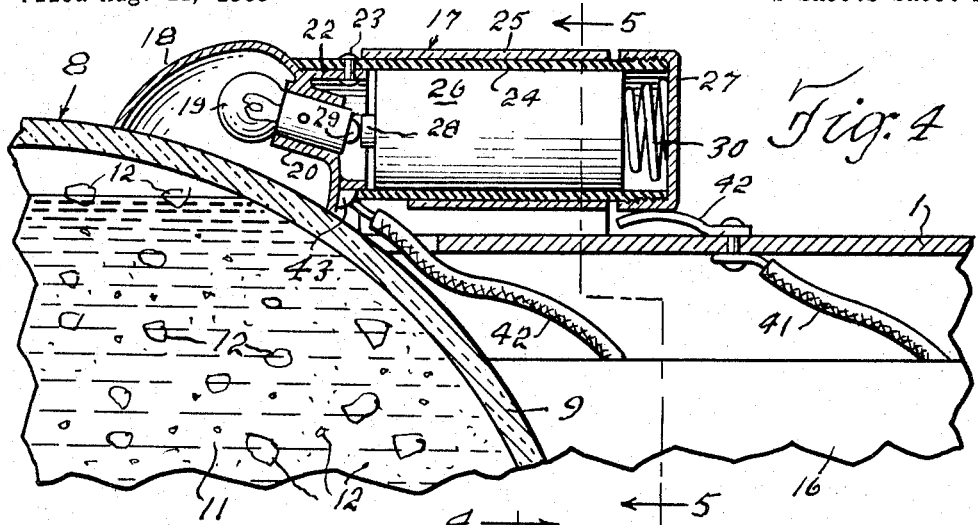
FIG. 4 is a further enlarged vertical longitudinal fragmentary detail section, through the light source of the device, taken on the lines 4—4 on FIGS. 3 and 5.
Figure 5:
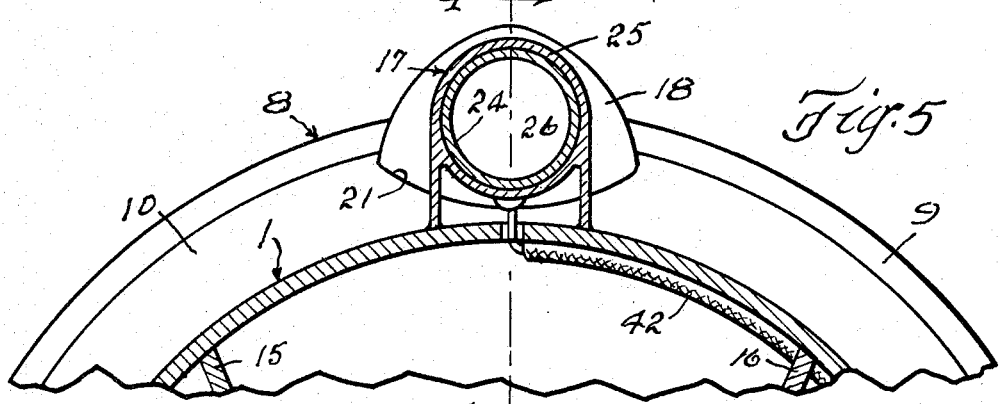
FIG. 5 is a vertical transverse fragmentary section taken on the line 5—5 on FIG. 4.
Figure 3:
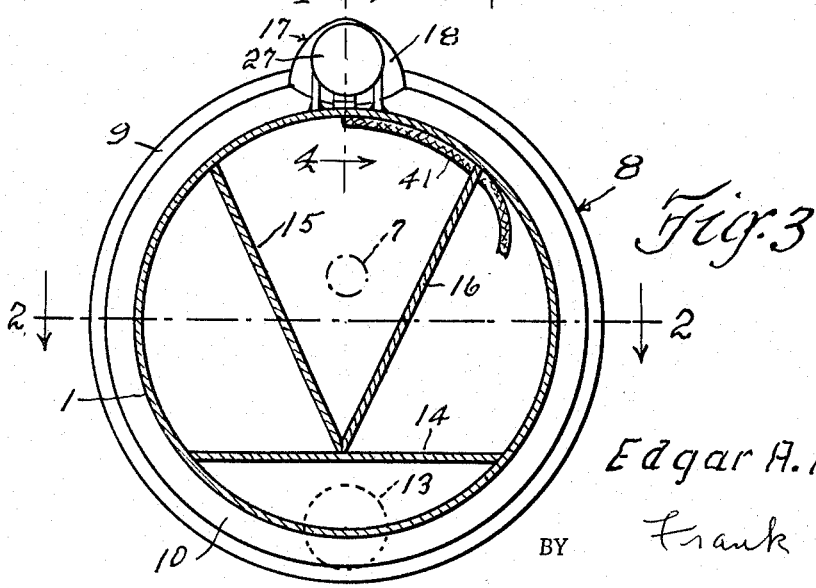
FIG. 3 is a vertical transverse section through the device, the plane of which is indicated by the lines 3—3 on FIGS. 1 and 2, and the scale of which is the same as FIG. 2.

The construction and operation of the device having been generally described it will now be specifically described in connection with the drawings by the use of reference characters in which the numeral 1 indicates an elongated open ended cylindrical thin walled tubular body member having an outwardly extending handle member 2, which comprises a base 3 and a pair of spaced hand grips 4 and 5, secured thereto intermediate the ends thereof. An eyepiece 6, having a sight opening 7 therein, is secured to the rear end of the body member 1 and an object enclosure, generally indicated by the numeral 8, is secured to the forward end thereof. The body member 1 and the eyepiece 6 are preferably formed of hard opaque nonconductive plastic material, but if desired may be formed from light thin sheet metal.

The object enclosure 8 comprises a hermetically sealed globe 9 which is adhesively secured in the outwardly flared forward end 10 of the body member 1 and partially extends into the body member 1. The globe 9 is preferably formed of clear transparent glass, but if desired it may be formed of hard clear transparent water repellent plastic material. The globe 9 is substantially filled with a clear transparent liquid 11, such as water or light oil, and a multiplicity of pattern producing objects 12 are housed therein. A small solid ball or marble 13, of greater density than the liquid 11 is also disposed within the globe 9. As previously stated the pattern producing objects 12 comprise a variety of objects, and particles of matter, which vary as to size, shape, color, and density, from glittering powders of microscopic size to conventional sized objects of varying compositions and contrasting in specific gravity. Whenever the globe 9 is moved or rotated in any direction about the center thereof the marble 13 will roll about on the inner surface of the globe 9 thereby agitating the liquid 11 and the objects 12 immersed therein, which results in the objects moving in all directions with some of them gradually sinking, some rising or floating, and others remaining suspended in the liquid.

A partition 14, which is mounted in fixed position in the body member 1 in spaced relation to the axis thereof, extends transversely from wall to wall and longitudinally between the eyepiece 6 and the globe 9 parallel to the axis of the body member 1. A pair of opposed conventional kaleidoscope reflectors 15 and 16, which are secured in fixed position in the body member 1, extend upwardly and outwardly from the longitudinal center line of the partition 14 and into engagement with the inner wall of the body member 1, coextensively with the partition 14. The area of sight between the sight opening 7 and the globe 9 is therefore confined between the opposed faces of the reflectors 15 and 16 and the subtended area of the inner surface of the body member 1. The pattern producing objects 12 will therefore, when agitated, pass into and out of the vision of one viewing the globe 9 and the pattern producing objects therein through the sight opening 7. As the pattern producing objects variously move up or down, to either side, and toward and away from a viewer as they move into and out of a viewer's sight, they produce slow and graceful changes of pattern having a three-dimensional effect.

A source of direct illumination, generally indicated by the numeral 17, which is incorporated in the device to eliminate the necessity for directing the device toward an extraneous source of light and to enable the use of the device in the dark, comprises a small concave metal reflector 18, of the flash-light type, having a small electric light bulb 19 removably mounted in a metal socket 20 carried by the reflector 18. The reflector 18 is applied to the outer surface of the globe 9 in a cut out section 21 of the flaring forward end of the body member 1, in position to project light into the globe 9 against the near or rearward surfaces of the pattern producing objects within the globe 9. The portions of the globe 9 within the body member 1 and under the reflector 18 are clear and transparent, and the exposed portion thereof is frosted as indicated by the stippling on the globe in FIG. 1, to render it translucent. The reflector 18 is provided with an annular hub 22 which is secured, by a rivet 23, in the forward end of a cylindrical nonconductive battery casing 24 which is mounted in fixed position in a saddle 25 secured to and extending outwardly from the body member 1. A small flashlight battery 26 is removably mounted in the casing 24, and the rear end of the casing 24 is closed by a metallic cap 27 which is threaded thereonto. The positive terminal 28 of the battery 26 is spring pressed into engagement with the positive terminal 29 of the bulb 19 by a coiled spring 30 which is interposed between the rear end of the battery 26 and the inner face of the cap 27.

The energization of the light bulb 19 is manually controlled by a normally open switch, generally indicated by the numeral 32, which is operatively associated with the handle member 2. The switch 32 comprises a finger actuatable trigger 33 which is pivotally mounted, as indicated at 34, in a slot 35 in the base 3 of the handle member 2 adjacent the rearward hand trip 5, and extends upwardly into the body member 1 below the partition 14. A movable contact 36 is carried by the upper end of the trigger 33, and a cooperating stationary contact 37 is secured in the upper end of a post 38 which is mounted in fixed position in the body member 1 adjacent the upper end of the trigger 33 in position for the stationary contact 37 to be engaged by the movable contact 36 when the trigger 33 is actuated. The switch 32 is normally yieldingly maintained in open position, as shown in FIG. 6, by a leaf spring 39 which is mounted in a recess 40 in the handle member and bears against the rear edge of the trigger 33 below the pivot 34. The movable contact 36 is connected, by a conductor 41, to a spring contact arm 42 which is secured in fixed position to the outer surface of the body member 1 in engagement with the metal cap 27; and the stationary contact 37 is connected by a conductor 42, to the reflector 18 as indicated at 43. When the switch 32 is closed by the manual actuation of the trigger 33, current will flow from the positive end of the battery 26 through the terminals 28 and 29 and a bulb 19 to the reflector 18 and from the reflector 18 through to conductor 43, contacts 37 and 36, conductor 41, spring contact arm 42, cap 27, and spring 30 back to the negative end of the battery 26 thereby completing the circuit to and energizing the light bulb 19.

From the foregoing it will be apparent to those skilled in this art that I have provided a very simple and efficient device for accomplishing the objects of the invention.

It is to be understood that I am not limited to the specific construction shown and described herein as various modifications may be made therein within the spirit of the invention and the scope of the appended claims.

I claim:

1. A kaleidoscopic viewing device comprising an elongated cylindrical tubular body member, an eyepiece secured to one end of said body member, an axially disposed sight opening in said eyepiece, an object enclosure secured to the other end of said body member, a multiplicity of pattern producing objects disposed within said object enclosure, and handle means by which said device is adapted to be held during use secured to said body member; said object enclosure comprising a hermetically sealed hollow globe of greater diameter than the diameter of said body member which is formed of transparent material and is substantially filled with a clear transparent liquid; and said pattern producing objects comprising a variety of glittering particles of matter which vary as to size, shape, color and density from glittering powders of microscopic size to conventional sized objects of varying compositions and contrasting specific gravity whereby some of the objects will gradually sink in said liquid, and others will rise in said liquid and float thereon and others will remain suspended in the said liquid.

2. A kaleidoscopic viewing device as defined by claim 1 in which a relatively small marble is disposed within said object enclosure, the specific gravity of said marble being such that it will sink to the bottom of said liquid and rest on the inner surface of said globe, said marble being adapted to roll around on the inner surface of said globe during angular changes of said object enclosure and thereby agitate said liquid and the pattern producing objects immersed therein.

3. A kaleidoscopic viewing device as defined by claim 1 in which a manually controllable light source which is adapted to project light into said object enclosure and illuminate the pattern producing objects therein is incorporated in said viewing device.

4. A kaleidoscopic viewing device as defined by claim 3 in which said light source comprises a relatively small concave reflector which is applied to the outer surface of said globe adjacent the junction thereof with the said other end of said body member, an electric light bulb mounted in said reflector, a dry cell battery which is carried by said body member, an electric circuit between said bulb and said battery, and a manually operable switch interposed in said circuit.

5. A kaleidoscopic viewing device as defined by claim 4 in which the portions of said globe within the end of said body member and under said reflector are transparent and the exposed portion of said globe is frosted to render it translucent.

6. A kaleidoscopic viewing device as defined by claim 5 in which a relatively small marble is disposed within said object enclosure, the specific gravity of said marble being such that it will sink to the bottom of said liquid and rest on the inner surface of said globe, said marble being adapted to roll around on the inner surface of said globe during angular changes of said object enclosure and thereby agitate said liquid and the pattern producing objects immersed therein.

7. A kaleidoscopic viewing device as defined by claim 1 in which a partition and a pair of opposed diverging reflectors are mounted in said body member; said partition extending transversely from wall to wall of said body member and longitudinally from end to end thereof parallel to the axis thereof; and said reflectors extending from end to end of said body member and upwardly and outwardly from the longitudinal center of said partition and into engagement with the inner surface of said body member.

References Cited

UNITED STATES PATENTS

| 2,066,548 | 1/1937 | Thompson | 350—5 |
| 2,115,986 | 5/1938 | Da Costa | 350—5 |
| 2,430,318 | 11/1947 | Zimmerman | 350—4 |
| 3,099,933 | 8/1963 | Weiner | 350—4 |
| 3,131,593 | 5/1964 | Grow | 350—4 |

FOREIGN PATENTS

| 8,909 | 1893 | Great Britain. |
| 565,880 | 12/1944 | Great Britain. |

JULIA E. COINER, *Primary Examiner.*